United States Patent [19]

Bourrez et al.

[11] 4,023,023

[45] May 10, 1977

[54] FIELD SELECTION DATA OPERATING DEVICE

[75] Inventors: Jean-Marie Bourrez, Versailles; C. Nessin Chemla, Saint-Cloud; Jean-Louis Fressineau, Les Clayes-sous-Bois; Maurice Hubert, Versailles, all of France

[73] Assignee: Compagnie Internationale pour l'Informatique, Louveciennes, France

[22] Filed: Nov. 27, 1974

[21] Appl. No.: 527,871

[30] Foreign Application Priority Data

Dec. 4, 1973 France .................... 73.43136

[52] U.S. Cl. .................... 235/152; 340/172.5
[51] Int. Cl.² .................... G06F 15/30
[58] Field of Search .......... 340/172.5; 235/164, 235/175, 152, 174; 179/15; 445/1

[56] References Cited

UNITED STATES PATENTS

| 3,596,074 | 7/1971 | Mitrofanoff | 235/174 |
| 3,728,689 | 4/1973 | Edwards, Jr. | 340/172.5 |
| 3,861,585 | 1/1975 | Courboulay et al. | 235/164 |

Primary Examiner—Malcolm A. Morrison
Assistant Examiner—Errol A. Krass
Attorney, Agent, or Firm—Kemon, Palmer & Estabrook

[57] ABSTRACT

A field selection data operating device consists of three cascade connected circuits: a field selector and shifter circuit, an arithmetical and logical operator circuit and a bit shifter and concatenator circuit. The selector and shifter circuit is controlled by a field length code, a shift value code and a first field bit rank code. It comprises two stages of multiplexing members. The first stage ensures, in circular permutation, a shift of the bytes of an applied data word so as to place the byte containing the bit of the first field bit rank code at the place in the word pointed by the shift value code and the second stage completes the shift to the said bit in the byte and generates an output mask according to the field length code. The mask is also applied to concatenation control inputs of the bit shifter and concatenator circuit.

5 Claims, 7 Drawing Figures

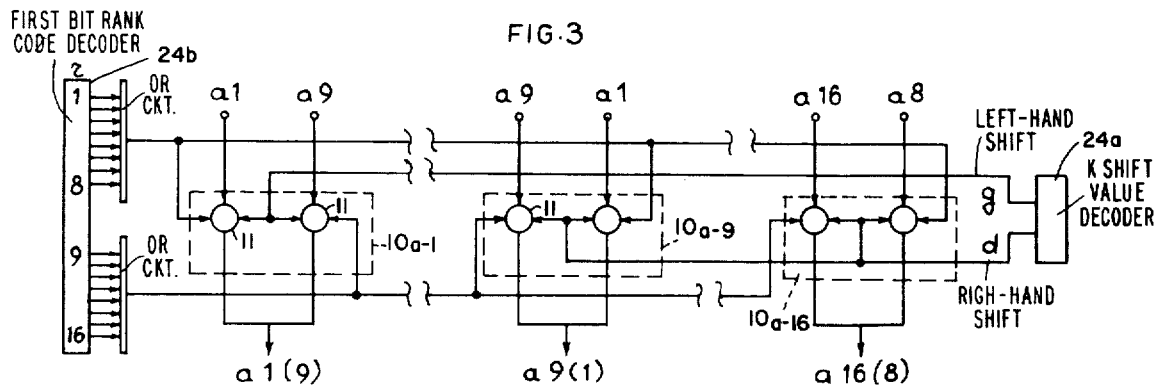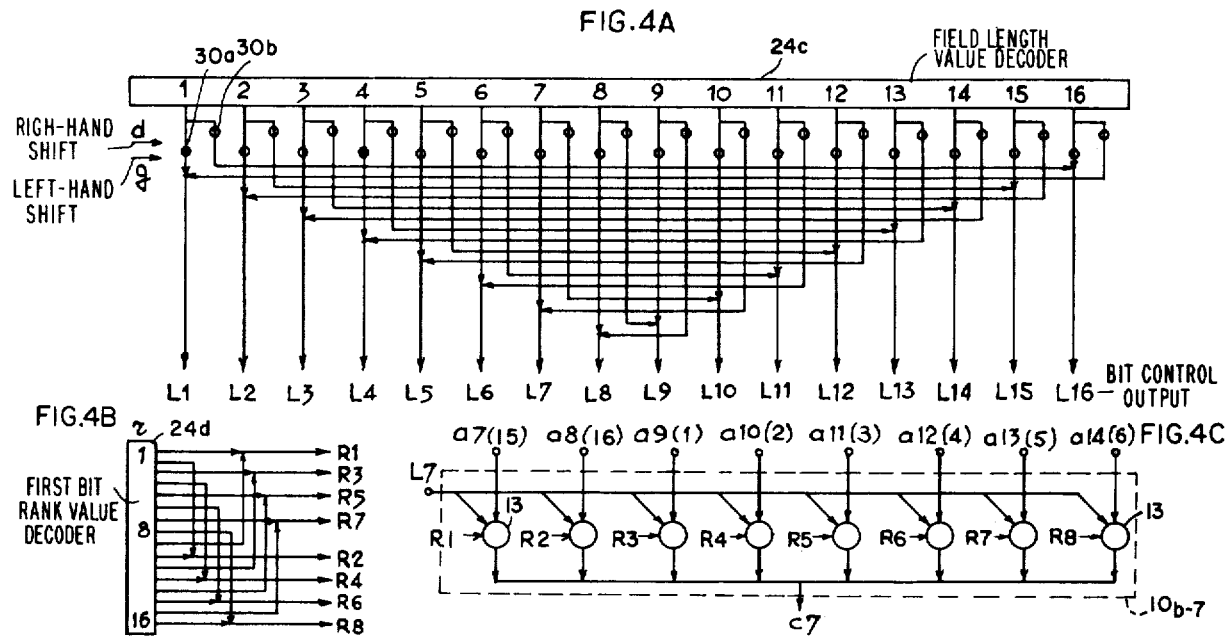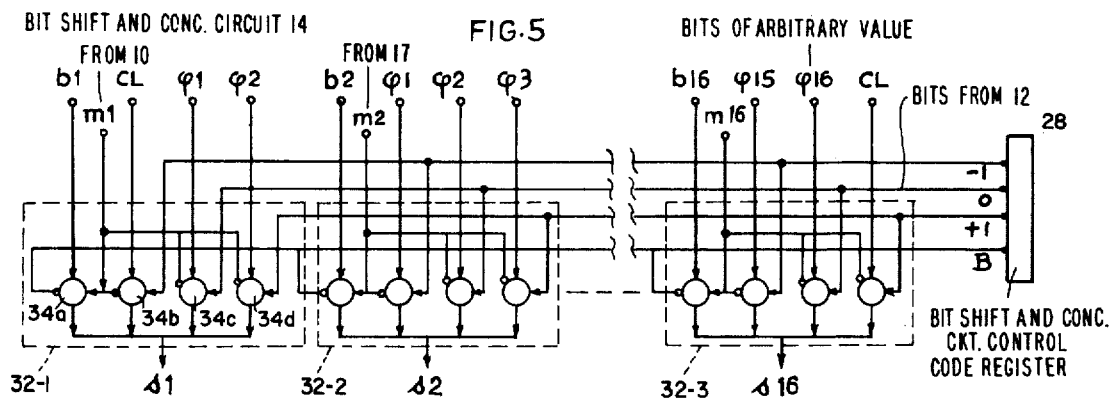

FIELD SELECTION DATA OPERATING DEVICE

BRIEF SUMMARY OF THE INVENTION

The present invention concerns improvements in or relating to devices operating on data words each made of a number of bytes and each byte having the same number of bits.

It more particularly concerns improvements in or relating to such operating devices wherein one at least of two data words to be arithmetically and/or logically combined is, prior to the combination operation proper, the subject of a selection of a field of bits which, further, is shifted by a definite number of bits with respect to the input of the combination circuit to which it is applied, and wherein, further, the data word issuing from the combination circuit may be the subject of further shifts and/or concatenation with a further data word in parts thereof defined by the application of a mask.

A device according to the invention comprises in cascade-connection a field selector and shifter circuit controlled by a field length code, a shift value code and a first bit rank code, a logical and arithmetical operator circuit controlled by an operation code for combining the output of the field selector and shifter circuit with another data word, and a bit shifter and concatenator circuit controlled by a command code for ensuring predetermined shifts and/or concatenation of bits of and with the data word issuing from the operator circuit and is mainly characterized in that the field selector and shifter circuit comprises two cascaded stages of multiplexer members, the first stage shifting the bytes of the applied data word according to the shift value code and the first bit field rank code, the second stage completing the shift to the said rank and applying a mask to the outputs according to the field length code, said mask being further applied to concatenation control inputs of the bit shifter and concatenator circuit.

SHORT DESCRIPTION OF THE DRAWINGS

The invention will be described in full detail with reference to the accompanying drawings, wherein:

FIG. 1 shows a block form representation of a device according to the invention, FIG. 2 shows an example of embodiment of the selector and shifter circuit of the device, FIG. 3 shows a more detailed partial view of the first stage of multiplexing members of FIG. 2, FIGS. 4A, 4B and 4C show more detailed partial views of the second stage of multiplexing members of FIG. 2, and, FIG. 5 shows a partial view of the bit shifter and concatenator circuit of the device.

DETAILED DESCRIPTION

Figure 1:
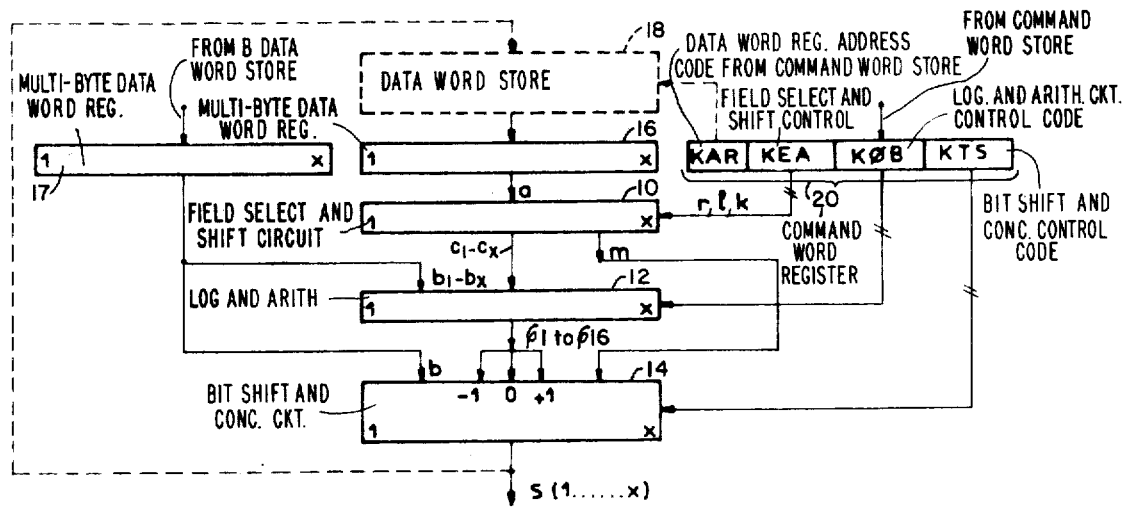

In FIG. 1, the device is xto the output of a data word store 18 and the data word outputting the device is brought back to the the word data store 18. Each word comprises bits $1 \ldots x$. A register 20 is loaded from a command store not shown, with the codes controlling the operation of the device. The portion KAR of the register 20 supplies the address to the selected cell of storage 18 in which the outputting word $S(1 \ldots x)$ must be stored. Each word $A(1 \ldots x)$ read out from the store 18 and loaded into the read-out register 16 of the store 18 is first applied to a field selector and shifter circuit 10 which operates according to three control codes supplied from the portion or KEA of the command register 20. These codes respectively represent a value $r$ which is the rank of the bit in the word from which must be selected from the field of bits within the circuit 10, a value $l$ which is the length of the field to be selected in the data word and a length or degree $k$ which is the value of the shift to be imparted to the selected field of bits in the data word from the register 16. The output word from the circuit 10 is applied to one input of a logical and arithmetic operator circuit 12 while to another input of which is applied another data word from a read-out register 17 of another data store not shown. The nature of the operation by circuit 12 is defined by the code issuing from the portion or stage KOB of the command register 20. The operation of circuit 12 is conventional which does not need any further detailed description except that it is operating in parallel numeration. It must be understood that the complete device operates within a single clock time interval of the unit to which it is incorporated, consequently all the three circuits 10, 12 and 14 operate in the so-called parallel numeration manner.

Any word A, bits $a_1$ to $a_x$ applied to the circuit 10 is converted into a word of restricted length starting from a determined rank of the bits in circuit 10 and shifted in accordance with the shift value $k$. In the concerned example, said shift value can only be either 0 or 1 which means that the selected field of bits must be only edit or set to either the right end or the left end of the word, from $c_1$ to $c_x$, to be outputted from the circuit 10. The values of the shift control code are consequently marked $d$ (right) and $g$ (left) on the drawings as seen in FIGS. 3 and 4. Of course other values of the shift code could be used without departing from the spirit and scope of the invention. The selected and shifted bits issuing from the outputs $c_1$ to $c_x$ of the selector and shifter circuit 10, part of which are zeroes, are applied to corresponding inputs of a first set of inputs of the arithmetical and logical operator circuit 12. The bits $b_1$ to $b_x$ of the other data word from the register 17 are applied to the bit inputs of a second set of inputs of circuit 12. When needed, the data word from store 17 may also pass through a further selector and shifter circuit such as 10 which would be controlled from another part of the command register 20.

The bits $\phi_1$ to $\phi_x$ of the word derived from the operator circuit 12 are applied to inputs of a shifter and concatenator circuit 14 which is controlled from command codes issuing from the part KTS of the command register 20. The circuit 14 may comprise a single multiplexing stage whereas, as it will be hereinafter detailed, the selector and shifter circuit 10 will comprise two cascade connected multiplexing stages. A clear understanding of the term "multiplexing" will appear from the following description of the circuits.

The commands of circuit 14 produce one of the following results:

1. the data word from circuit 12 is transfered without any shift or concatenation to its output S,
2. the data word from circuit 12 is transferred with a one unit right shift to the output S,
3. its data word from circuit 12 is transferred to the output S with one unit left shift, and,
4. the data word from circuit 12 is concatenated with bits of a further word, which may be the word from B, according to a mask applied from a mask output of the circuit 10 to mask control inputs to the circuit 14.

It must be understood that any one of the three commands (1) to (3) supra may be concomitant to the fourth command (4) in the control of the circuit 14. It must be understood too, that the number of right and left shift commands may be increased as required, without departing from the spirit and scope of the invention.

It must also be understood that an additional masking command could be applied from the portion KTS concomitantly to the masking control from the circuit 10.

As stated, each data word is made of a fixed number of bytes each having an identical number of bits, or at least, this word must be considered as such from the point of view of the invention even if this has no actual meaning in the storage of such a word. The number of bits in a byte is a sub-multiple of the number $x$ of bits in the word. For instance, a most often used byte is a byte comprising 8 bits. Such an eight-bit byte may be termed an "octet". According to the invention, the selector and shifter circuit 12 of the device comprises two cascaded connected multiplexing stages, each having a number of multiplexing members or circuits as are bits in a data words. The first stage ensures a shift, in circular permutation, of the bytes so as to bring the byte containing the bit defined by the rank code $r$ to the shifted position defined by the shift value code $k$. The second stage completes the shift to bring the bit of rank code $r$ to the place defined by the shift code $k$, the first or the last bit position in the concerned example, and limits the accesses of the bits to the bit outputs to those bits only in the field length defined by the field length code $l$. This operation directly defines a mask for such outputs and this mask will also be applied to concatenation masking control inputs of the circuit 14.

In the first stage, each multiplexing member has as many inputs as are bytes in the data words. In the second stage, each multiplexing member has as many inputs are bits in a byte. The inputs of the multiplexing members of the second stage are connected to the outputs of the multiplexing members of the first stage according to a circular permutation of said outputs with a shift by one bit from member to member. The inputs of the multiplexing members of the first stage are connected to the terminals receiving the bits of corresponding rank in the bytes, with a shift by one rank from member to member.

Figure 2:
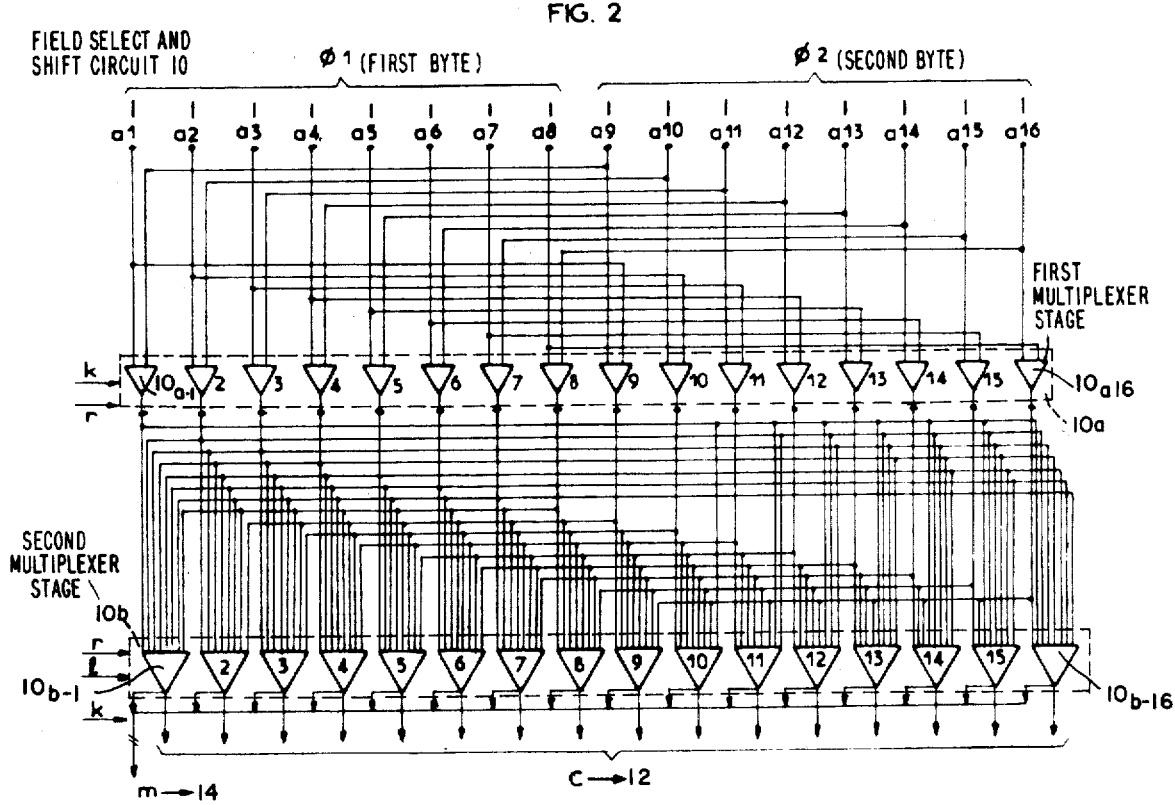

The embodiments shown in FIGS. 2 to 4 concern an illustrative example of a data word comprising only two bytes, each of eight bits, i.e. two octets. The first byte 01 comprises the bits $a_1$ to $a_8$ and the second byte 02 comprises the bits $a_9$ to $a_{16}$. The rank value code $r$ comprises four bits and the decoder circuits thereof, FIG. 3 or FIG. 4, each comprises 16 outputs, from 1 to 16. The field length value code also comprises four bits and its decoder circuit, FIG. 4, comprises 16 outputs, from 1 to 16. As the shift value code only consists of a single bit, its decoder comprises a mere bistable device or circuit 24a, FIG. 3, having two complementarily activated outputs $d$ and $g$.

The selector and shifter circuit 10 comprises, as shown in FIG. 2, a first stage 10a of such multiplexing circuits, from $10_{a\text{-}1}$ to $10_{a\text{-}16}$ from the left to the right and each such member comprises, as shown in FIG. 3, a pair of gates 11 the outputs of which are connected as a logical OR output. Each gate 11 is an AND-gate receiving an appropriate bit from an input of the $a_1$ to $a_{16}$ inputs of the circuit and having two control inputs which must both be activated at a defined logical level for unblocking the transfer of the input information bit $a$ to the output of the gate. The multiplexing circuit $10_{a\text{-}1}$ receives the bits $a_1$ and $a_9$, the circuit $10_{a\text{-}2}$, the bits $a_2$ and $a_{10}$, and so forth, the ninth circuit $10_{a\text{-}9}$ receiving the input bits $a_9$ and $a_1$ and the sixteenth member receiving the bits $a_{16}$ and $a_8$. The $g$ output of the shift value decoder 24a is connected to a control input of the gates of the first eight multiplexing circuits $10_{a\text{-}1}$ to $10_{a\text{-}8}$ and the other output $d$ of the decoder 24a is applied to a control input of the gates 11 of the other eight multiplexing circuits $10_{a\text{-}9}$ to $10_{a\text{-}16}$.

For the first stage, the outputs 1 to 8 of the decoder 24b of the rank value $r$ are united and applied to control inputs of all the left-hand gates of the eight first multiplexing circuits $10_{a\text{-}1}$ to $10_{a\text{-}8}$ and to control inputs of all the right-hand gates 11 of the last eight multiplexing circuits $10_{a\text{-}9}$ to $10a\text{-}16$. The outputs 9 to 16 of the $r$ value decoder 24b are similarly connected as a logical OR output and the OR-signal therefrom is applied to the control inputs of the right-hand gates 11 of the eight first multiplexing circuits $10_{a\text{-}1}$ to $10_{a\text{-}8}$ and of the left-hand gates of the eight other multiplexing circuits $10_{a\text{-}9}$ to $10_{a\text{-}16}$ of the first stage. Of course, the two logical-OR outputs of the decoder always are of opposite logical levels.

It is plain to check that when the rank $r$ is of a lower value than 9 and when the output $g$ of the $k$ decoder 24a is activated, the bits $a_1$ to $a_{16}$ will be transferred without any modification to the outputs of the first stage 10a and that these bits will also be transferred without modification to their outputs when the rank $r$ is of a higher value than 8 but the output $d$ of the $k$ decoder 24a is activated. It is also plain to check that when the rank $r$ is lower than 9 and the $d$ output of the $k$ decoder 24a is activated, or conversely when the rank $r$ is higher than 8 and the $g$ output of the $k$ decoder 24a is activated, the octet bytes will be permutated at the outputs of the multiplexing circuits of the first stage 10a, i.e. the data word at the output of the first stage will be: $a_9 a_{10} \ldots a_{16} a_1 a_2 \ldots a_8$.

The outputs of the first stage 10a are distributed to the inputs of the multiplexing circuits $10_{b\text{-}1}$ to $10_{b\text{-}16}$ of the second stage 10b. The second stage 10b comprises 16 multiplexing circuits of 8 bit inputs each. The first $10_{b\text{-}1}$ at the left of the second stage 10b receives the bits outputting the members from 1 to 8 of the first stage 10a, the second circuit $10_{b\text{-}2}$ from the left receives the bits outputting the circuits $10_{a\text{-}2}$ to $10_{a\text{-}9}$ of the first stage 10a, and so on in a regularly progressive circular permutation, to that the sixteen circuits $10_{b\text{-}1}$ to $10b\text{-}16$ from the left of the second stage receives the bits outputting the circuits $10_{a\text{-}16}$, $10_{a\text{-}2}$, $10_{a\text{-}3}$, $10_{a\text{-}4}$, $10_{a\text{-}5}$, $10_{a\text{-}6}$ and $10_{a}\text{-}7$ of the first stage 10a.

As illustratively shown in FIG. 4C, each multiplexing circuits $10_{b\text{-}1}$ to $10_{b\text{-}16}$ of the second stage 10b may comprise eight AND-gates the outputs of which are connected in logical-OR relation to the output of said member. In FIG. 4, there is shown the multiplexing member $10_{b\text{-}7}$ of the second stage 10b from which issues the bit $c7$ from the selector circuit 10. Each input of the multiplexing circuit may receive another one of two $a$ bits according to the condition of the circuit of the first stage 10a connected to that input. The multiplexing circuit $10_{b\text{-}7}$ of FIG. 4 receives on its eight inputs the bits $a7(15)$, $a8(14)$, $a9(1)$, $a10(2)$, $a11(3)$, $a12(4)$, $a13(5)$ and $a14(6)$. The parentheses mark the alternatives.

Each AND-gate 13 is unblocked only when receiving identical logical level signals, either 11 or 00, on its two control inputs. It remains blocked when receiving 10 or 01.

The outputs of the decoder 24c of the rank value r are paired in logical-OR connection in order to supply control signals to the gates of the multiplexing circuits of the second stage 10b, as shown in FIG. 4B: the outputs 1 and 9 of the decoder 24d procude the signal R1, the outputs 2 and 10 produce the signal R2, and so on. There are eight control signals from R1 to R8 in such a decoding arrangement. In each multiplexing circuit $10_{b-1}$ for instance, shown in FIG. 4C the R control signals are, from left to right: R1, R2, R3, R4, R5, R6, R7 and R8.

Each multiplexing circuit of the second stage 10b receives a common control signal on all its AND-gates 13. Each such control signal is obtained from the combination of the field length value, expressed in the term of the number of binary digits (bits) to select from the first rank bit of the selected field. The decoder 24c of the field length code, as shown in FIG. 4A, presents sixteen outputs. It is the number of activated outputs from the output 1 which determines for the circuit 10 the length l of the field to select. Such signals cannot be directly applied to the second multiplexing stage circuit without further taking into account the value of the shift code. In the concerned example, the value is given as activation of the output d or of the output g of the k decoder 24a, as shown in FIG. 3. Each output of the field length code decoder 24c is splitted in two connections, each one comprising an AND-gate 30 (merely shown by a dot). One of the said AND-gates 30b receives the signal d as an unblocking signal, the other gate 30a receives the signal g as an unblocking signal. The outputs of the gate 30 are paired on sixteen outputs, from L1 to L16 according to the following connecting process: the output of the g-controlled gate 30a of the decoder output 1 is OR-connected to the output of the d-controlled gate 30b of the decoder output 16. The output L1 is applied to the first, from the left, multiplexing circuit $10_{b-1}$ of the second stage 10b. Conversely, the output of the d-controlled gate 30b of the decoder output 1 is OR-connected to the output of the g-controlled gate of the decoder output 16 so as to obtain a control signal L16. The outputs of the d-controlled and g-controlled gates of the other decoder outputs are similarly combined, as shown, so that finally, 16 signals, from L1 to L16 are obtained, respectively applied to the control inputs of the gates of the multiplexing circuits $10_{b-1}$ to $10_{b-16}$, one of which is shown in FIG. 4C.

In the concerned example, the shifts are "total" in that the the end bits of the selected field will be either abutting the right end or the left end of the set of bit outputs; actually the shift values are 1 for g and 16 for d. When the shift value code includes other values, the outputs of the k decoder 24a will be selectively distributed to the gates 11 of the multiplexing circuits of the first stage 10a and selectively distributed to the outputs of the decoder 24c of the field length and also combined in the same fashion as shown in FIG. 4A, the number of AND-gates 11 by each output being equal to the number of values of k, and the outputs of the gates 11 will be OR-connected according to a similar law as the one which has been hereinabove described to the sixteen output lines L1 to L16.

Each time the field selector and shifter circuit 10 operates, a bit mask code is automatically generated at the outputs thereof, either in a plain representation (bit value 1 at each activated output) or in a complement to one's representation (bit value "0" at each activated output), or better and more simpler such a mask code is automatically generated at the outputs L of the described selection control arrangement. Whether such mask generating outputs are derived from the bit c outputs or from the L outputs of the circuit is unimportant and a mere matter of choice.

The data word issuing from the field selector and shifter circuit 10 is applied to a corresponding first set of inputs of the arithmetical and logical operator circuit 12 which concomitantly receives another data word on the corresponding second set of inputs. This other data word may of course be an all zeroes code when the register 17 remains unloaded. This will be the case for certain operations in circuit 12.

At the output of the circuit 12 will appear a result word comprised of the bits $\phi_1$ to $\phi_{16}$ (more generally speaking $\phi_x$). It may be assumed that no carry of bits will occur within 0b outside the field length selected by circuit 10 for the first data word. Consequently, all the o bit outputs external to said field will be 0 (or 1 in a complementary representation if needed).

Such a result word may be plainly and directly transferred by the circuit 14 to the its S (1 . . . x) outputs. It must be noted that it will not be imperative that circuit 14 actually exists in a system according to this invention, though usually such a circuit is provided in these systems. When provided, the circuit 14 acts as a shifter and concatenator circuit of the data word issuing from circuit 12 and, illustratively, the concatenation may be made with bits from the same B word, though the case of a further word, other than A and B for concatenation is not excluded.

FIG. 5 shows an illustrative embodiment of a the circuit 14. It comprises 16 multiplexing circuits 32-1 to 32-16 each comprising four AND-gates 34. One of the four gates 34a having its information input to a bit input of a concatenated code is unblocked when the mask bit m is applied to one of its control inputs is of a concatenation authorizing value and when concomitantly an unblocking signal B commanding concatenation is issued by the KTS code decoder 28, and applied to its other control input. The three other AND-gates 34 of the circuit 32 are respectively connected to three distinct outputs of the arithmetical and logical circuit 12 (except one of said gates in the first and the last multiplexing members, as shown, which receives an arbitrary bit value CL). In the shown example, said distinct outputs are of consecutive ranks, for instance $\phi_1$, $\phi_2$, $\phi_3$. Each one of the three gates 34 is inhibited by the activation of the mask input m of the circuit and unblocked by a command issued from a particular one output of the decoder 28, for instance the ones marked −1, 0 and +1 in FIG. 5.

Obviously, a more complex conditioning could be obtained from the provision of the circuit 14 having additional and-gates to those which are shown or having substitute and-gates to the shown ones.

What is claimed is:

1. Data word operating apparatus to process data words each having a given number of bytes, each byte having a given number of bits, comprising the combination of:

a. a first circuit having as many bit inputs and as many bit outputs as are bits in one of said data words and comprised of means for selectively routing the bits of an inputted data word to said bit outputs, said selectively routing means having first, second and third control inputs;
b. means for applying to said first control input a control code defining the length of a field of bits to be selected in the inputted data word;
c. means for applying to said second control input a control code defining the value of a shift to apply to said selected field of bits;
d. means for applying to said third control input a code defining the rank of the bit of the inputted data word which is the first bit of the field of bits to be selected;
e. a second circuit comprised of a logical and arithmetical means, a first set of bit inputs respectively connected to said bit outputs of said first circuit, a second set of bit inputs for receiving a further data word, an operation control circuit having a fourth control input, and a set of bit outputs;
f. means for applying to said fourth control input an operation control code;
g. a third circuit comprised of shift and concatenator means, with bit outputs, and including:
  1. first sets of bit inputs selectively connected to said bit outputs of said second circuit,
  2. said shift and concatenator means coupled with said first set of bit inputs for imparting a predetermined shift and applying the shifted bits to said bit outputs of said third circuit, and
  3. a second set of concatenable bit inputs of the same number as are bit inputs in each of said first sets;
h. a shift selection and concatenation control input having means for applying a shift selection and concatenation control code to said control input,
i. said selective bit routing means of said first circuit including cascade-connected first and second multiplexer stages, each stage comprising a plurality of bit multiplexing circuits equal to the number of bits in a data word, each multiplexing circuit of said first stage having a plurality of bit inputs equal to the number of bytes in one of said data words, and which bit inputs are connected to receive the bits of corresponding ranks of the bytes of an inputted data word, the value of the rank progressively varying by one unit from circuit to circuit of said first stage, each multiplexing circuit of second stage having a plurality of bit inputs equal to the number of bits in a byte of one of said data words, and which bit inputs are connected respectively to selected, successive outputs of said multiplexing circuits of said first stage in a manner to permit a circular permutation of said outputs from multiplexing circuit to multiplexing circuit of said second stage;
j. said first circuit comprising means for decoding the control codes applied to said second and third control inputs and for permutating the bytes of the inputted data word according to the value of the shift defined by said control code applied to said third control input;
k. means for decoding said control code applied to said third control input and for deriving therefrom a command signal routing the bit of the rank defined by said control code, to the output of each multiplexing circuit of said second stage;
l. means for decoding the control codes applied to said first and second control inputs and for deriving therefrom a multi-bit mask inhibiting such bit routing to the outputs of said multiplexing circuits of said second stage in excess of the number of bits in said selected field; and
m. means for applying selectively bits to said concatenation control terminal of said third circuit, in accordance with said multi-bit mask.

2. Data word operating apparatus according to claim 1, wherein said shift and concatenator means comprises a plurality of bit multiplexing circuits equal to the number of bits in a data word, decoding means responsive to said shift selection and concatenation control code for decoding same to derive and apply command signals to said multiplexing circuits to selectively pass in a first manner the bit inputs applied to said first sets of bit inputs and to selectively pass in a second, opposite manner the bit inputs applied to said second set of concatenable bit inputs.

3. Data word operating apparatus to select a field of bits from a data word of a length defined by a control field length code and to shift said selected field according to a shift value code and a code indicative of the rank of the bit in the data word which is the first bit of the selected field, each data word to be processed comprised of a plurality of bytes, each byte having a given number of bits, said apparatus comprising:
a. first and second multiplexing stages, each stage having a plurality of multiplexing circuits equal to the bits of one of said data words, each multiplexing circuit of said first stage having as many bit inputs as are bytes in one of said data words, said bit inputs being connected to terminals supplied with bits of identical rank in the bytes, the value of said rank varying by one unit from circuit to circuit of said first stage, said second stage comprised of a plurality of multiplexing circuits each having a plurality of inputs equal to the number of bits in a byte, and respectively connected to as many consecutive outputs of said multiplexing circuits of said first stage according to a circular permutation of said outputs from circuit to circuit of said second stage; and
b. means responsive to the shift value code and the first field bit rank code for controlling the operation of said multiplexing circuits of said first stage to shift the bytes in a circular permutation, and for controlling said circuits of said second stage according to decoder outputs of the shift value code, the first bit field rank code and the field length code for controlling the final shift up to said first rank bit and masking the outputs of the bits outside said field length.

4. Data word apparatus for processing data words, comprising:
a. a field selector and shifter circuit controlled by a field length code, a shift value code and a first bit rank code;
b. a logical and arithmetical operator circuit controlled by an operation code for combining the output of said field selector and shifter circuit with another data word; and
c. a bit shifter and concatenator circuit having control inputs and being controlled by a command code for selectively shifting and concatenating the bits of a data word derived from said logical and arithmetical operator circuit, d. said field selector and shifter circuit comprising two cascade-connected stages of multiplexer circuits, said first stage shifting the bytes of the applied data word according to the shift value code and the first bit field rank code, said second stage completing the shift according to said rank and applying a mask to bits derived from its outputs according to the field length code, said mask being further applied to said control inputs of said bit shifter and concatenator circuit.

5. Apparatus for processing data words, each comprising a given number of bytes, each of said bytes comprised of a given number of bits, said processing apparatus comprising in cascade connection:

a. a first circuit for receiving an inputting data word, for selecting a field of bits of successive ranks therefrom and for shifting the bits of the selected field at a time substantially simultaneous to the selecting of a field of bits, in response to first, second and third control codes;

b. first control code means for providing a first control code defining the number of bits in the field of bits to be selected by said first circuit;

c. second control code means for providing a second control code defining the value of the shift to impart to the bits of the selected field;

d. third control code means for providing a third control code defining the rank of the bit which is the first bit of the field to be selected in the inputted data word;

e. logical and arithmetical control means;

f. a second circuit for combining the selected and shifted field word derived from said first circuit with a further inputted data word, under the control of said logical and arithmetical control code means;

g. bit shift and concatenator control code means; and h. a third circuit having bit transfer control inputs controlled by said bit shift and concatenator control code means, for editing the word derived from said second circuit, i. said first circuit comprising first and second multiplexing stages, each stage having a plurality of cascade-connected bit multiplexer circuits, said first stage being controlled by said second and third control codes for shifting in accordance therewith the bytes of the inputted data word, said second stage responsive to said first, second and third control codes for shifting the bits derived from said multiplexer circuits of said first stage up to the rank defined by the third control code and the shift defined by the second control code and for applying an inhibiting mask to the outputs of said multiplexer circuits of said second stage having ranks higher than the number of bits defined by said first control code, said mask being simultaneously applied to said bit transfer control inputs of said third circuit.

* * * * *